March 3, 1970  J. A. MEHR  3,498,577
ADJUSTABLE BRACKET STRUCTURE
Filed May 31, 1968  3 Sheets-Sheet 1
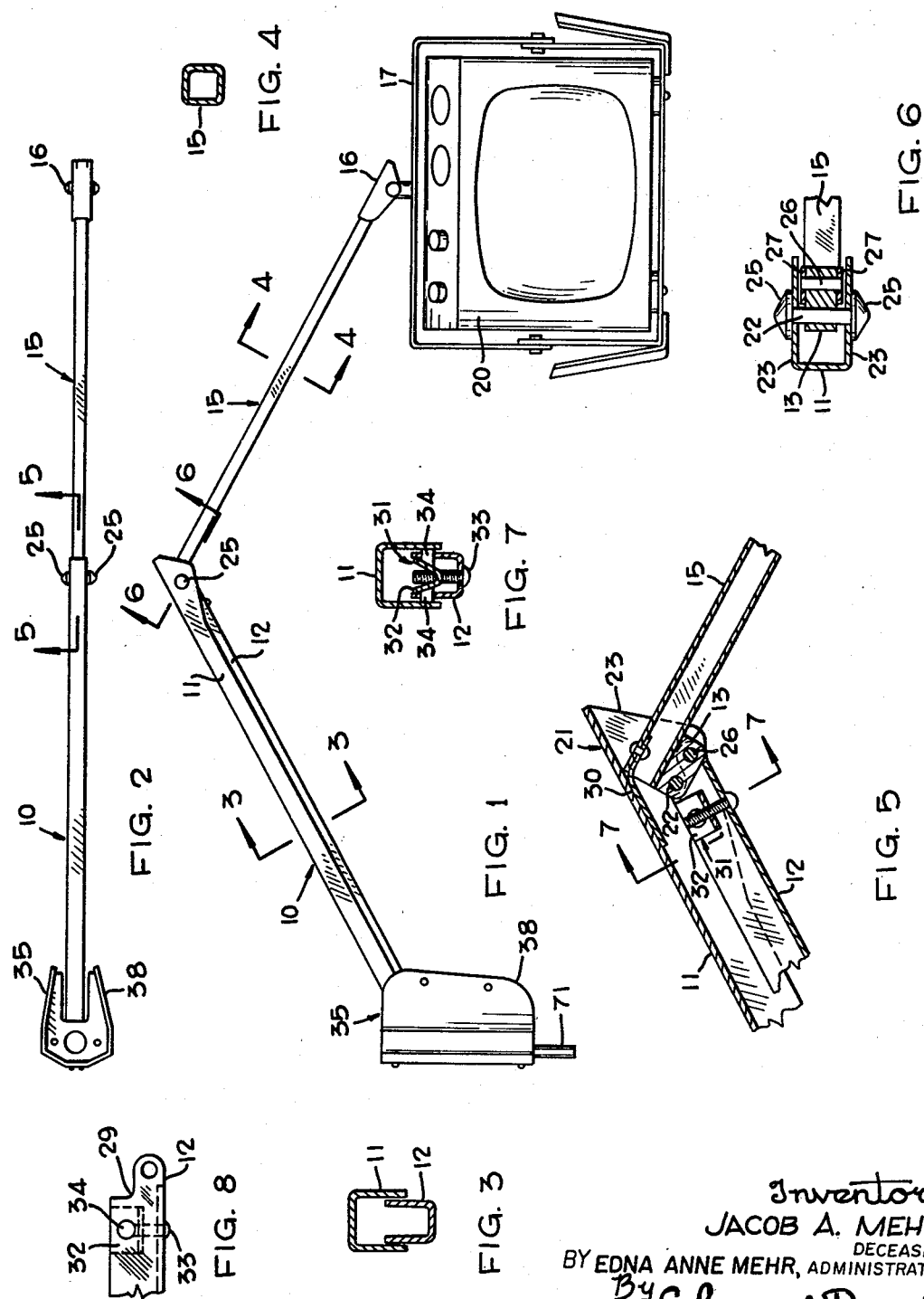
Inventor
JACOB A. MEHR,
DECEASED,
BY EDNA ANNE MEHR, ADMINISTRATRIX
By Cohn and Powell
Attorneys March 3, 1970   J. A. MEHR   3,498,577
ADJUSTABLE BRACKET STRUCTURE
Filed May 31, 1968   3 Sheets-Sheet 2
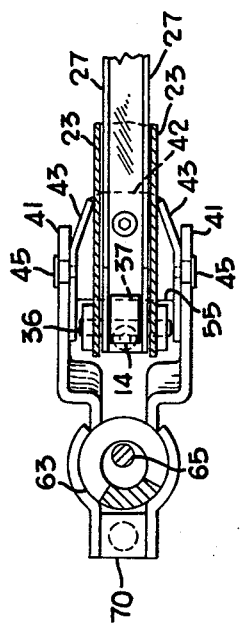
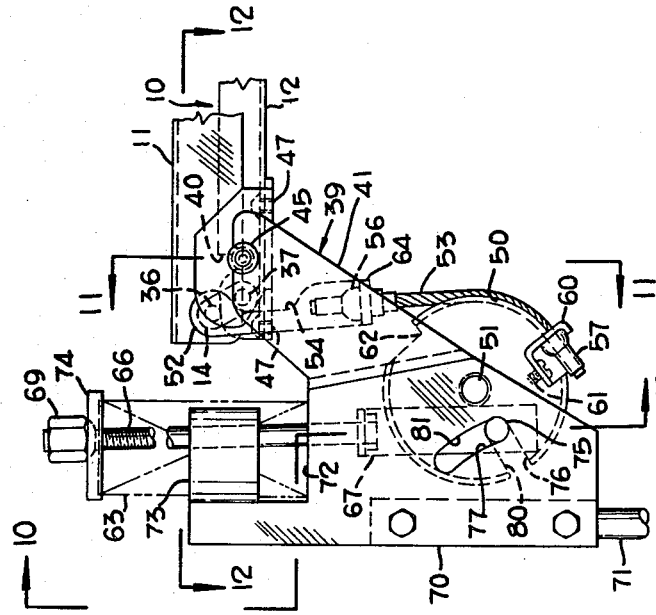
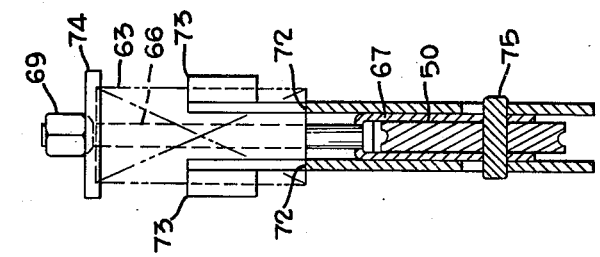
Inventor
JACOB A. MEHR,
DECEASED,
BY EDNA ANNE MEHR, ADMINISTRATRIX
By Cohn and Powell
Attorneys March 3, 1970  J. A. MEHR  3,498,577
ADJUSTABLE BRACKET STRUCTURE
Filed May 31, 1968  3 Sheets-Sheet 3

Inventor
JACOB A. MEHR,
DECEASED,
BY EDNA ANNE MEHR, ADMINISTRATRIX
By Cohn and Powell
Attorneys 
3,498,577
Patented Mar. 3, 1970

3,498,577
ADJUSTABLE BRACKET STRUCTURE
Jacob A. Mehr, deceased, late of Kirkwood, Mo., by Edna Anne Mehr, administratrix, Kirkwood, Mo., assignor to Dazor Manufacturing Corp., a corporation of Delaware
Filed May 31, 1968, Ser. No. 740,397
Int. Cl. A47f 5/00; A47g 29/02
U.S. Cl. 248—280                    20 Claims

ABSTRACT OF THE DISCLOSURE

The adjustable bracket includes an elongate inner arm, formd by a parallelogram linkage system, and pivotally attached to a base support at the inner end. An extension load-carrying arm is pivotally connected to the outer end of the elongate arm. A rotatable pulley is pivotally attached to the support, and a flexible link interconnects the inner end of the elongate arm to the pulley. Another link connects the pulley to a spring. The pulley includes a radial slot which cooperates with a curved slot in the base support to selectively adjust the position of the connection of the last said pulley and link, whereby to maintain a substantially constant balancing moment as the arm is adjusted for any position of the load.

BACKGROUND OF THE INVENTION

This invention relates generally to an adjustable bracket, and more particularly to a bracket adapted to carry a substantially constant load at a variable distance from a support.

Adjustable brackets exist in the prior art which, in common with the present bracket, have the ability to carry a substantially constant load at a variable distance from a fixed support. An examination of such brackets, however, reveals that the load-carrying capability of such brackets is invariably very small, of the order of two or three pounds. They are usually capable of carrying only a lamp or a similar lightweight structure.

Brackets which are capable of carrying heavier loads, in general, require much heavier base support, and hence the advantage of compactness is lost. Only with brackets capable of carrying only small loads has compactness been maintained. Even in the case of these brackets, the extension of the arm is likely to be less than thirty inches.

The small capacity, articulated bracket works well within the range of its intended use. However, although it is probably theoretically possible to increase the size of the counter-balancing unit on such a bracket, to cater for a greater load, the compactness would be lost. This is particularly true when both the load-carrying capacity is increased and the length of the extension arm is increased. For example, if the moment capacity and the extension of the arm are doubled, the resisting moment must be quadrupled to compensate for this increase. The combination of increased load capacity and increased arm extension would therefore require a counterbalancing unit out of all proportion to the size of the bracket as a whole.

SUMMARY OF THE INVENTION

By connecting a parallelogram linkage system to a cam-operated, load-compensating mechanism, compactness of the counterbalancing system is achieved. Moreover, the adjustable bracket is adapted to utilize the efficiency and load-carrying capacity of high strength compression springs because of the unique structural arrangement of the cam mechanism.

Without sacrificing compactness of the base support housing, the counterbalancing mechanism is such that one embodiment of the bracket has been adapted to carry a load of almost eighteen pounds at an extension of some fifty inches. This represents a moment capacity of some twenty times greater than that of many articulated brackets currently in use.

The provision of nested channels for the adjustable arm permits the use of the arm as a cable conduit facilitating the electrical connection of any load, such as a television set, which requires a power supply for its operation.

The adjustable bracket includes an elongate arm pivotally connected at its inner end to a support. An extension arm connected to the outer end of the support is adapted to carry a load. A rotatable body is pivoted to the support at a pivot axis, and link means operatively interconnect the inner end of the elongate arm to the body. A resilient, load-counterbalancing means is provided, and attachment means operatively attaches the resilient means to the rotatable body. This attachment means is disposed in selective spaced relation to the pivot axis.

The support includes a cam means, and the body also includes a cam means, the attachment means engaging the support cam means and the body cam means to adjust the spaced relation of the attachment means to the pivot axis whereby to substantially counterbalance the load upon rotation of the body as the adjustable arm pivots about the support.

The arm includes a pair of substantially parallel elongate links interconnected at associated ends by a pair of relatively short links, to form a parallel linkage system. The elongate links comprise opposed, nested channel members which form a substantially closed box section in which the channel members can move selectively toward or away from each other. The lower channel member is pivotally connected to the support between its ends at a distance from the inner end substantially equal to the length of the short link at the inner end.

The extension arm and the short link at the inner end bear substantially the same proportion of length relationship as the length between pivot points of the lower channel member in opposing directions from the support point.

The link means operatively interconnecting the inner end of the elongate arm to the body includes a flexible portion, and the rotatable body includes a pulley segment tangentially engaging and receiving the flexible portion as the body rotates.

The attachment means includes a pin movable with respect to the pivot axis. The support cam means and the body cam means each include a guide surface engaging the pin and controlling movement of the pin with respect to the pivot axis. The pivot axis is disposed between the tangency of the flexible portion and the pin.

The resilient means includes a compression spring interconnected to the rotatable body by the attachment means.

The support includes a slot providing the support cam means, and the body includes a slot providing the body cam means. The two slots cooperate to receive a pin at the end of the attachment means and to guide movement of the pin with respect to the pivot axis as the body rotates. The spring has a constant load-reflection rating, and one of the slots is arcuate whereby to guide the pin along a substantially hyperbolic path relative to the pivot axis to balance a substantially constant moment.

BRIEF DESCRIPTION OF THE DRAWINGS

FIG. 1 is a general view of the adjustable bracket supporting a load;

FIG. 2 is a plan view of the adjustable bracket;

FIG. 3 is an enlarged cross sectional view of the adjustable arm taken on line 3—3 of FIG. 1;

FIG. 4 is an enlarged cross sectional view of the extension arm taken on line 4—4 of FIG. 1;

FIG. 5 is a fragmentary cross sectional view taken on line 5—5 of FIG. 2, illustrating the elbow joint between the adjustable arm and the extension arm;

FIG. 6 is an enlarged fragmentary cross sectional view taken on line 6—6 of FIG. 1, illustrating the stabilizer;

FIG. 7 is a cross sectional view taken on line 7—7 of FIG. 5, further illustrating the stabilizer;

FIG. 8 is an enlarged fragmentary view of the end of the lower member of the adjustable arm at the elbow joint;

FIGS. 9, 10 and 11 are enlarged fragmentary, elevational views of the side, rear and front respectively of the support and counterbalance mechanism;

FIG. 12 is a plan view taken on line 12—12 of FIG. 9; and

DESCRIPTION OF THE PREFERRED EMBODIMENT

Figure 13:
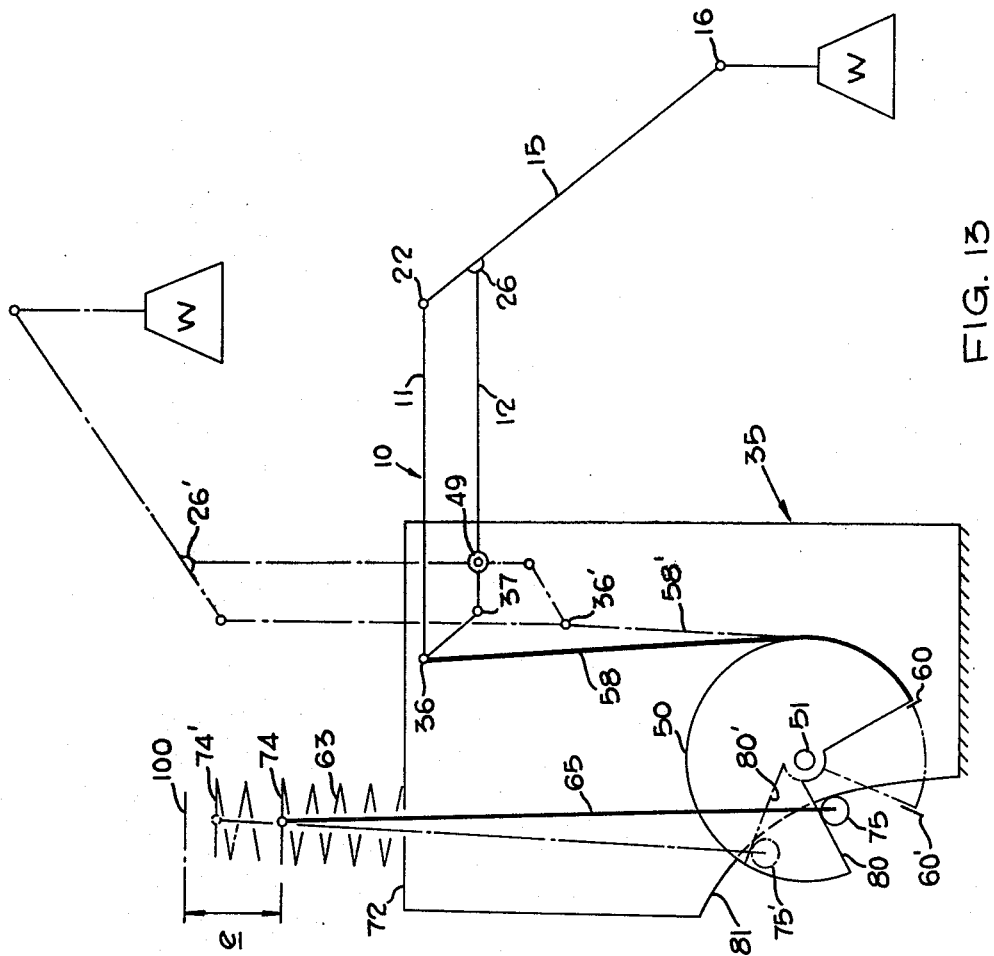
FIG. 13 is a diagrammatic illustration of the linkage and cam guide mechanism.

Referring now by characters of reference to the drawings, and first to FIGS. 1 and 2, it will be understood that the adjustable bracket comprises an elongate arm 10, an extension arm 15 and a support 35. The elongate arm 10 includes a pair of opposed nested channel members 11 and 12, constituting elongate links, and a pair of short links 13 and 14 (FIGS. 5 and 9) interconnecting associated ends of the channel members 11 and 12. The channel members 11 and 12 are substantially parallel and, as shown in FIG. 3, the lower channel member 12 is nested within the upper channel member 11.

In the preferred embodiment, the elongate links 11 and 12 and the short links 13 and 14 cooperate to provide a substantially parallelogram-shaped linkage system. It will be understood, however, that the use of the phrase "parallelogram-shaped" is essentially a convenience and that departure from this shape is possible as long as two relatively long links and two relatively short links are used.

The box-shaped extension arm 15, constituting a load-carrying means, is attached to the link 13 at the outer end of the elongate arm 10. The extension arm 15 is preferably, substantially the same length as the elongate arm 10, and includes an attachment means 16 at its outer end and supporting a frame 17, which is adapted to carry a load 20 such as a television set or the like.

The elbow joint 21 between the elongate arm 10 and the extension arm 15 is shown in detail in FIG. 5. The upper channel member 11 is pivotally connected to the link 13 by means of a pin 22 extending between the channel flanges 23 as shown in FIG. 6. The pin 22 is provided with retaining bosses 25 at each end.

The lower channel member 12 is pivotally connected to link 13 by means of a pin 26 which extends between the channel flanges 27 nested within the channel flanges 23, sufficient clearance being provided between the ends of the pin 26 to allow movement of the lower channel member 12 within the upper channel member 11. It will be observed from FIG. 8 that the lower channel member 12 is notched at its end 29 to provide clearance for the pin 22 as the extension arm 15 pivots about the pin 26 and induces movement into the upper arm 11.

A cover belt 30 (FIG. 5) made of spring material is attached to the extension arm 15 and serves the purpose of providing a closure as the elbow joint 21 opens up. Such opening occurs when the angle between the elongate arm 10 and the extension arm 15 is more acute than illustrated in FIG. 5. This cover belt 30 is omitted for clarity in FIG. 6.

In order to control the relative looseness of movement between the upper and lower channel members 11 and 12, a stabilizer 31 is provided to permit variation between the frictional engagement of the nesting channel members 11 and 12. The stabilizer 31 is best shown by reference to FIGS. 5 and 7, and includes a V-shaped wedge member 32 which is threadedly connected to a screw 33. By turning the screw, the V-shaped member 32 may be moved in- or outwardly relative to the lower channel member 12. A wardly or outwardly relative to the lower channel member 12. A pair of opposing nylon plugs 34 are inset into the side flanges of the lower channel member 12, each plug having an inwardly facing wedge face. It will be understood that as the screw is turned to draw the wedge member 32 inwardly of the channel member 12, the nylon plugs 34 are forced laterally against the flanges of the upper channel 11, thereby increasing the frictional engagement between the nested channel members 11 and 12.

Referring now to the inner end of the elongate arm 10, it will be understood that the arm 10 is pivotally connected to the support, which is generally indicated by numeral 35 in FIGS. 1 and 2, and that the support mechanism is covered by a housing 38. The inner end connection of the elongate arm 10 to the support is shown in detail in FIG. 9.

FIG. 9 clearly illustrates the pivotal relationship between the upper and lower channel members 11 and 12, which are interconnected at their inner end by means of the short link 14, comparable to the link 13 at the outer end. A pivot pin 36, extending between the flanges of the upper channel member 11, pivotally connects one end of the short link 14 to the upper channel member 12 and a pivot pin 37, extending between the flanges of the lower channel member 12, pivotally connects the other end of the link 14 to the lower channel member 12.

It will be observed that the lower channel member 12 is notched at its end 40 to provide clearance for the pin 36 as the upper and lower channel members 11 and 12 move relative to each other. It will be understood that the notched end 40 may be so shaped as to provide stop means limiting movement of the channel members 11 and 12 relative to each other and hence, limiting movement of the elongate arm 10 as a whole.

FIG. 13 illustrates diagrammatically the interrelationship between the elongate links 11 and 12 and short links 13 and 14 in the preferred embodiment.

As shown in FIGS. 9 and 12, the elongate arm 10 is pivotally supported by a standard 39 which includes a pair of opposing parallel side plates 41. The standard 39 forms part of the support 35. The pivotal support of the elongate arm 10 is accomplished by the provision of a relatively wide, substantially channel-shaped, auxiliary platform member 42, which is attached to the underside of the lower channel member 12 as by set screws 47. The platform member 42 includes opposing parallel side flanges 43 which are disposed laterally outward of the side flanges 27 of the lower channel member 12 to form lugs cooperating with parallel side plates 41. A trunnion-bushing 45 constituting pivotal means is attached, as by welding, to each of the side flanges 43, and a pair of slots 48 (FIG. 11) at the upper end of the side plates 41, provides a journal rotatively mounting each trunnion-bushing 45.

From FIG. 9 it can be seen that the adjustable elongate arm 10 is operatively attached to a pulley 50, which is rotatively mounted between the side plates 41 by a pin 51 constituting a pivot axis extending between the side plates 41. The pulley 50, which constitutes a body, is interconnected to the elongate arm 10 by a compound pull link 58 which includes a substantially U-shaped strap 52 and a flexible cable 53.

The pivot pin 36, interconnecting the upper channel member 11 and the short link 14 extends outwardly from the side flanges 23 of the upper channel member 11 to provide a means of pivotally connecting the strap 52 to the adjustable arm 10. The strap 52 includes a notch 54 which ensures that the strap 52 clears the pivot pin 37 interconnecting the lower channel member 12 and the short link 14. Likewise, the bight portion of the channel-shaped member 42 is notched to clear the strap 52. This notch is shown generally by numeral 55 in FIG. 12.

The flexible cable 53 includes opposing ends, each provided with a non-slip stop nut attached to the cable 53 in clamped relation. At one end of the cable 53, the stop nut 56 cooperates with the bight of the V-shaped strap 42 to hold the cable 53 in position. At the other end of the cable 53, the stop nut 57 cooperates with a removable abutment portion 60 which is notched into the pulley 50 and secured by a set screw 61. It will be observed that the pulley 50 also includes a notch 62 to permit clearance of the cooperating nut connection 64 at the underside of the bight of the strap 52.

The pulley 50 is interconnected to a compression spring 63, constituting a resilient means, by an attachment means including a forked pull link 65. The link 65 includes a threadedly adjustable bolt 66 and a U-shaped strap 67, the head of the bolt 66 cooperating with the inside of the bight of the strap 67.

A pressure plate 74 is provided at the upper end of the spring 63, said plate 74 including a countersunk hole receiving a swivel nut 69 whereby to permit swivel movement of the forked pull link 68 within the open central portion of the spring 63 and to adjust the compression on the spring 63.

The side plates 41 are separated by means of a bolted spacer rod 70, and cut-away portion of each side plate 41 provides a seat 72 which supports the other end of the compression spring 63. Each side plate 41 includes a circular cantilever portion 73, the two portions embracing the spring 63, whereby to serve as a guide means slidably receiving the spring 63. The rod 70 includes a circular portion 71 at its lower end which provides pivotal mounting for the support as a whole.

The pull link 65 and the pulley 50 are interconnected by a pin 75. The pin 75 extends between and outwardly of the legs of the U-shaped strap 67, and the pivot center of the pin 75 bears a fixed relation to the strap 67.

The strap 67 straddles the pulley 50, and the pulley 50 includes a slot 76 selectively receiving the pin 75. Side plates 41 include opposed arcuate slots 77 selectively receiving the outwardly extended portions of the pin 75.

The upper edge 80 of the pulley slot 76 constitutes a support cam means, and the upper edge 81 of the arcuate slot 77 likewise constitutes a body cam means. These two cam means 80 and 81 cooperate to adjust the distance of the pin 75 from the pivot axis of the pulley 50.

Because of the parallel linkage system providing the adjustable arm 10, the vertical component of the pull in the flexible cable 53 remains substantially constant for a given load W. The lever arm of the pull force in the flexible cable 53 likewise remains substantially constant and, in consequence, moment forces on the right-hand side of the pivot axis 51 are also substantially constant for a given load W.

It will be understood that the pulley 50 provides a curved face which rotates about the pivot point 51 and determines the lever arm of the force in the pull link 58. When this curved surface is provided by a constant radius pulley 50, the moment varies with the force in the pull link 58. When this force is substantially constant (as it is where pull link 58 is relatively long and the force in the pull link 58 is substantially equal to its own vertical component) then the moment about the rotational center 51 is also substantially constant. When the pulley 50 rotates in a clockwise direction, as the position of the arm 10 is changed, precompression in the spring 63 is relieved and the overall load on the spring 63 is decreased. As this load is decreased, the pin 75 moves upwardly and also, because of the cooperating cam arrangement, outwardly. In this manner, the lever arm of the resistance load of the spring 63 is increased as the load is decreased whereby to substantially counterbalance the moment from the load W.

The ends of the arcuate slot 77 provide stop means limiting the movement of the pin 75.

The housing 38, which is shown in FIG. 1 has been omitted for clarity in FIGS. 8, 9 and 10. The housing 38 conceals the working parts of the support 35 and presents a pleasing and compact appearance to the over-all unit.

It is believed that the structure and functional interrelationship of the various parts of this adjustable bracket have become apparent from the foregoing description of parts. For completeness of disclosure, however, the operation of the bracket as a whole, will be briefly described with particular reference to the diagrammatic representation of the linkage as shown in FIG. 16.

For convenience in the following discussion, it will be assumed that the system is one-dimensional. The various components will be referred to in the singular although for practical reasons, some components, for example, the side plates 41, are paired.

It is to be understood that FIG. 13 illustrates two positions of the adjustable elongate arm 10. In order to simplify the explanation, the full lines will be assumed to be representative of the arm 10 at a lower limit of its rotational movement about pivot 49 in its low position, and the broken lines representative of an upper limit of the rotational movement of the arm.

The nature of the parallel linkage system, provided that certain dimensional relationship conditions are fulfilled, is such that a constant vertical load W produces a substantially constant vertical component in the pull leak 58. These conditions are fulfilled, for example, when the pivot points 16 and 49 are equidistant from pivot point 26; when the pivot points 36 and 49 are equidistant from pivot point 37, and when pivot points 36, 37, 22 and 26 form the corner points of a true parallelogram. It will will be observed that in this case, the pivot point 36 is disposed in variable spaced relation from pivot point 49.

The conditions are also fulfilled when the distances between pivot points 26 and 16 and pivot points 36 and 37 are proportionally related as the distance between pivot points 49 and 26 and 49 and 37 are related.

In both of the above cases, the relationships, though not essential, produce a substantially balanced arm for all positions of a constant load W.

Of course, the parallel linkage system permits movement of the load W independently of the rotation of the arm 10 but in order to facilitate the discussion, the pivot point 26 will be assumed to be frozen.

When the lengths of the link 58 and 65 are relatively long, the balancing of moments about the rotational center, provided by the pivot axis 51 of the pulley 50, becomes largely a matter of balancing opposed tangential forces. That is, the balancing of moments acting on the pulley 50 may be achieved by balancing the vertical components of force in the pull link 58 and the pull link 65 in the preferred embodiment.

In the initial position, as indicated by the full lines, a load W is placed at the end of the carrying arm 16, may be balanced by precompression of the spring 63, from an initial position 100 through a displacement e. If now, the load is moved to another position, as indicated by the broken lines, pivot point 36 will move to pivot point 36' and, the flexible portion of the link 58 will be received onto or wound around the pulley 50 as the pulley 50 rotates in a clockwise direction. Such rotation is induced into the pulley 50 by the tendency of the compression spring 63 to expand from 74 to 74' as the load W is moved. This expansion decreases the compression in the spring 63 and, if the lever arm of the force induced in the link 65 were fixed, then the spring 63 and the load would simply tend to oscillate.

However, because movement of the pin 75 is controlled by the cam guide edge 81 and the cam guide edge 80, the lever arm of the force in the pull link 65 is increased as the force in the pull link 65 decreases. Thus, by judicious choice of curvature of cam edges 80 and 81 which, so to speak, hold the pin 75 captive, the lever arm increase can be made compensatory with the decrease of compression load in the spring 63 thereby to provide a substantially constant moment, counterbalancing the substantially constant moment from the force in the pull link 58.

Ideally, a given constant moment, such as that on the right-hand side of the pulley 50, is balanced by an equal and opposite moment or resistance moment. The tangential force required to produce the resistance moment varies depending on its distance from the center of rotation. Such a force is infinitely large when the moment arm is zero and infinitely small when the moment arm is infinitely large.

In the case where the tangential force is provided by a compression spring having a constant rate, as in the preferred embodiment, the reciprocal character of the tangential force and its distance from the center of rotation produce a hyperbolic form of relationship.

Thus, consistent with a constantly decreasing force on the pull link 65, the path described by the pin 75 will be that of a hyperbolic function. If, therefore, the curved surface of the cam edge 81 corresponds to the requisite hyperbolic function, the lever arm and the tangential force will vary inversely to provide a substantially constant resistant moment.

Over a short range the arcuate hyperbolic curve may be approximated, for practical purposes, to a circumferential curve. The cam edge 81 as shown in FIG. 9 may, therefore, have a constant radius without appreciable loss of accuracy.

Obviously, practical considerations require other deviations from the ideal. For example, it is not possible to provide pull links 58 and 65 of infinite length. However, within the guide lines presented above, an adjustable arm may be constructed without difficulty.

Secondary moment forces and forces due to the weight of the various parts of the structure itself have an effect on the balancing. These secondary effects are complicated by the friction which is encountered between the various joints. Moreover, the provision of the stabilizer 31 between the arms 11 and 12 creates a built-in frictional control which may be varied as desired.

What is claimed is:

1. An adjustable bracket, comprising:
   (a) a support including cam means,
   (b) an elongate adjustable arm including an inner end and an outer end,
   (c) pivot means pivotally connecting the inner end of the arm to the support,
   (d) load-carrying means at the outer end of the arm adapted to carry a load,
   (e) a rotatable body pivoted to the support at a pivot axis, the body including cam means,
   (f) link means operatively interconnecting the inner end of the elongate arm to the body,
   (g) resilient, load-balancing means,
   (h) attachment means operatively attaching the resilient means to the body, the attachment means being disposed in selective spaced relation to the pivot axis by engagement with the support cam means and body cam means, and
   (i) the support cam means and the body cam means cooperating to adjust said spaced relation whereby substantially to counterbalance the load on rotation of the body as the adjustable arm pivots about the support.

2. An adjustable bracket as defined in claim 1, in which:
   (j) the elongate arm includes a pair of elongate links and a pair of relatively short links, one of said short links pivotally connecting associated ends of the elongate links at the inner end of the elongate arm, and the other of said short links pivotally connecting associated ends of the elongate links at the outer end of the elongate arm.

3. An adjustable bracket as defined in claim 2, in which:
   (k) the load-carrying means includes an extension arm attached to the short link at the outer end of the elongate arm.

4. An adjustable bracket as defined in claim 2, in which:
   (k) the pivot means pivotally connecting the inner end of the arm to the support includes pivotal connection of one of said elongate links to the support at a point disposed between interconnection points of the said short links to said one elongate link.

5. An adjustable bracket as defined in claim 1, in which:
   (j) the link means, operatively connecting the inner end of the elongate arm to the body, includes a flexible portion, and
   (k) the body includes a peripherally curved portion rotatable about the pivot axis and receiving the flexible portion as the body rotates.

6. An adjustable bracket as defined in claim 1, in which:
   (j) the elongate arm includes a pair of elongate links and a pair of relatively short links, one of said short links pivotally connecting associated ends of the elongate links at the inner end of the elongate arm, and the other of said short links pivotally connecting associated ends of the elongate links at the outer end of the elongate arm,
   (k) the link means, operatively interconnecting the inner end of the elongate arm to the body, includes a flexible portion, and
   (l) the body includes a peripherally curved portion rotatable about the pivot axis engaging and receiving the flexible portion as the body rotates.

7. An adjustable bracket as defined in claim 2, in which:
   (k) the attachment means includes a pin movable with respect to the pivot axis, and
   (l) the support cam means and body cam means each include a guide surface engaging the pin and controlling movement of the pin with respect to the pivot axis to provide said selective spaced relation of the attachment means to the pivot axis.

8. An adjustable bracket as defined in claim 7, in which:
   (m) the resilient means includes a spring, one end of the spring being carried by the support,
   (n) the attachment means includes an elongate link having opposed ends, one end being attached to the other end of the spring, and
   (o) the pin is carried by the other end of the elongate link.

9. An adjustable bracket as defined in claim 8, in which:
   (p) the elongate link is selectively adjustable in length between its ends,
   (q) the spring has a substantially constant load-deflection rating, and
   (r) at least one cam guide surface is arcuate.

10. An adjustable bracket as defined in claim 2, in which:
    (k) the link means, operatively interconnecting the inner end of the elongate arm to the body, includes a flexible portion,
    (l) the body includes a peripherally curved portion rotatable about the pivot axis, engaging and receiving the flexible portion as the body rotates,
    (m) the attachment means includes a pin movable with respect to the pivot axis, and
    (n) the support cam means and the body cam means each include a guide surface engaging the pin and controlling movement of the pin with respect to the pivot axis to provide said selective spaced relation of the attachment means to the pivot axis.

11. An adjustable bracket as defined in claim 2, in which:
 (k) the link means operatively interconnecting the inner end of the elongate arm to the body, includes a flexible portion,
 (l) the body includes a pulley segment tangentially engaging and receiving the flexible portion as the body rotates,
 (m) the attachment means includes a pin movable with respect to the pivot axis,
 (n) the support cam means and the body cam means each include a guide surface engaging the pin and controlling movement of the pin with respect to the pivot axis to provide selective spaced relation of the attachment means to the pivot axis, and
 (o) the pivot axis is disposed between the tangency of the flexible portion and the pin.

12. An adjustable bracket as defined in claim 2, in which:
 (k) the resilient means includes a spring, one end of the spring being carried by the support,
 (l) the attachment means includes an elongate link having opposed ends, one end being pivotally attached to the other end of the spring and the other end including a pin movable with respect to the pivot axis,
 (m) the support cam means includes a slot provided in the support,
 (n) the body cam means includes a slot provided in the body, and
 (o) the support slot and the body slot receive the pin whereby to guide movement of the pin with respect to the pivot axis as the body rotates.

13. An adjustable bracket as defined in claim 12, in which:
 (p) the spring has a constant load-deflection rating, and
 (q) one of said slots is arcuate whereby to guide the pin along a substantially hyperbolic path relative to the pivot axis to balance a substantially constant moment as the spring deflects.

14. An adjustable bracket as defined in claim 12, in which:
 (p) the link means, operatively interconnecting the inner end of the elongate arm to the body, includes a pull link pivotally connected to the arm at one end and having a flexible portion attached to the body at the other end,
 (q) the body includes a pulley tangentially engaging and receiving the flexible portion as the pulley rotates, and
 (r) the pivot axis is disposed between the tangency of the flexible portion and the pin.

15. An adjustable bracket as defined in claim 2, in which:
 (k) the link means, operatively interconnecting the inner end of the elongate arm to the body, includes a pull link pivotally connected to the arm at one end, and a flexible portion attached to the body at the other end,
 (l) the body includes a peripherally curved portion rotatable about the pivot axis engaging and receiving the flexible portion as the body rotates,
 (m) the elongate links of the elongate arm are substantially parallel, one above the other,
 (n) the link means pivotally connecting the inner end of the arm to the support include pivotal connection of the lower elongate link to the support at a point disposed between the interconnection points of said short links to said lower link, and
 (o) the intersection of the upper elongate link and the short link at the inner end of the elongate arm form a pivot point disposed in variable spaced relation from the pivotal connection between the arm and the support, and the pull link is operatively interconnected to one of said links at the inner end of the elongate arm.

16. An adjustable bracket as defined in claim 15, in which:
 (p) the pull link is pivotally interconnected to the elongate arm at the intersection point of the upper elongate link and the short link of the inner end of the arm.

17. An adjustable bracket as defined in claim 15, in which:
 (p) the pull link is pivotally interconnected to the elongate arm at the intersection point of the upper elongate link and the short link of the inner end of the arm,
 (q) the load-carrying means includes an extension arm attached to the short link at the outer end of the elongate arm, and
 (r) the length of the extension arm beyond the pivotal connection of the outer short link to the lower elongate link, and the length of the short link at the inner end of the arm between its pivotal connections, are substantially proportionally related as the length of the lower arm from the support pivot to the outer short link pivot connection to the lower arm, and the length of the lower arm from the support pivot to the inner short link pivot connection to the lower arm are related.

18. An adjustable bracket as defined in claim 15, in which:
 (p) the elongate links consist of opposing nested channel members providing a substantially closed box section in which the channel members can move selectively toward or away from each other.

19. An adjustable bracket as defined in claim 15, in which:
 (p) clutch-stabilizing means between the elongate links provide adjustable frictional control of the elongate arm.

20. An adjustable bracket as defined in claim 1, in which:
 (j) the elongate arm includes:
  (1) upper and lower substantially channel-shaped members, one nested within the other to form a substantially closed box section in which the channel members can move selectively toward or away from each other, and
  (2) a pair of relatively short links, one of said short links pivotally connecting associated ends of the upper and lower channel members at the inner end of the elongate arm, and the other of said short links pivotally connecting associated ends of the upper and lower channel members at the outer end of the elongate arm,
 (k) the load-carrying means includes an extension arm attached to the short link at the outer end of the elongate arm,
 (l) the pivot means pivotally connects the lower channel to the support at a point disposed between the connection point of said lower channel to said links,
 (m) the link means, operatively connecting the inner end of the elongate arm to the body, includes a pull link pivotally connected to the arm at one end, and having a flexible portion attached to the body at the other end,
 (n) the body includes a pulley tangentially engaging and receiving the flexible portion as the pulley rotates,
 (o) the resilient means includes a spring, one end of the spring being carried by the support,
 (p) the attachment means includes an elongate link having opposed ends, one end being pivotally attached to the other end of the spring and the other end including a pin movable with respect to the pivot axis,
 (q) the pivot axis is disposed between the tangency of the flexible portion and the pin, (r) the support cam means includes a slot provided in the support,
(s) the pulley includes a slot providing the body cam means, and
(t) the support slot and the pulley slot receive the pin whereby to guide movement of the pin with respect to the pivot axis as the pulley rotates.

References Cited

UNITED STATES PATENTS

| | | | |
|---|---|---|---|
| 2,200,518 | 5/1940 | Perbal | 248—280 |
| 2,470,284 | 5/1949 | Bergmans et al. | 248—280 |
| 2,665,102 | 1/1954 | Perbal | 248—280 |
| 3,426,190 | 2/1969 | Bobrick | 240—73 |

ROY D. FRAZIER, Primary Examiner

J. FRANKLIN FOSS, Assistant Examiner

U.S. Cl. X.R.

248—123, 292